United States Patent [19]

Davis

[11] 3,915,799

[45] Oct. 28, 1975

[54] METHOD OF MINIMIZING COFACTOR LOSS IN ENZYMATIC REACTORS

[75] Inventor: James C. Davis, Benicia, Calif.

[73] Assignee: The Dow Chemical Company, Midland, Mich.

[22] Filed: July 5, 1974

[21] Appl. No.: 485,874

[52] U.S. Cl. .................. 195/30; 195/104; 195/110; 195/114; 195/115
[51] Int. Cl.² ........................................... C12D 1/02
[58] Field of Search ............ 195/30, 108, 115, 110, 195/114, 104

[56] References Cited
OTHER PUBLICATIONS

Boyer et al., The Enzymes, Vol. 7, Second Ed., Academic Press, New York, pp. 127–141, (1963).

Winegard, Enzyme Engineering, Interscience Publishers, New York, pp. 139–141, (1972).

*Primary Examiner*—Alvin E. Tanenholtz
*Attorney, Agent, or Firm*—Robert R. Stringham

[57] ABSTRACT

An improved process for conversion of substrates to products by use of enzyme/cofactor combinations in conjunction with semipermeable membranes is disclosed. Loss of cofactor through such membranes is largely prevented simply by employing an excess of the enzyme over the stoichiometric amount required to complex essentially all of the cofactor.

6 Claims, No Drawings

METHOD OF MINIMIZING COFACTOR LOSS IN ENZYMATIC REACTORS

BACKGROUND OF THE INVENTION

The use, in enzymatic reactors, of membranes impermeable to enzymes but permeable to substrate and product molecules is known. Unfortunately, such membranes are generally permeable also to the cofactors essential to oxoreductase enzymic action. A variety of ways to prevent cofactor losses has been proposed and/or tried. It has not been suggested that cofactor loss can be prevented simply by employing an excess over the stoichiometric requirement of enzyme.

Enzymatic conversions in which membranes are employed to keep the enzyme/cofactor complex separated from the substrate (and product) solution may be operated either as batch processes or as continuous processes. Continuous operation is more efficient and is highly preferred for production scale processes. However, cofactor losses are a more serious problem in continuous operations. In batch operation, cofactor loss through the membrane will cease when the cofactor activities on opposite sides of the membrane become equal. If enough cofactor is added to the substrate solution so that the activities are equal to start with, no net transfer of cofactor through the membrane will result. This is true whether or not the substrate solution is static or flowing, i.e., regardless of whether the process is a batch or continuous operation. In either case, the economics of large scale operation will necessitate recovery and recycle of the cofactor contained in the product (and substrate) solution.

It is apparent from the current literature that cofactor (or, alternatively, coenzyme) loss is considered a continuing problem. For example, the Aug. 1, 1973 issue of Chemical Week includes a report (at page 36) of research being done at the University of Pennsylvania on modification of a coenzyme by reaction with aziridine so that attachment to a polymer or porous matrix can be accomplished. This is "to conserve the coenzyme by confining it within a packed bed or semipermeable membrane reactor." The November 1973 issue of Enzyme Technology Digest includes (at page 84) an abstract of a paper on regeneration and utilization of coenzymes given by M. Weibel (University of Pennsylvania) at a recent symposium. The abstract follows:

"The current use of biological catalysts in practical applications is restricted by and large to simple hydrolytic enzymes. The economics and technical considerations regarding the conservation and regeneration of coenzymes has precluded the usefulness of enzymes which require cocatalysts of small or medium molecular weight. We describe the successful immobilization of an important class of redox coenzymes. Reactor configurations for the conservation of both enzyme and coenzyme for this class of biological catalysts will be presented."

It is an object of the present invention to provide a much simpler and more general solution to the problem of cofactor losses.

SUMMARY OF THE INVENTION

It has now been discovered that practical advantage can be taken of the fact that the concentration of cofactor in a liquid medium in contact with an enzyme/cofactor complex is dependent on the relative proportions of enzyme and cofactor present. If the proportion of enzyme is made large enough, the concentration of free cofactor in the medium can be made very low. The cofactor activity at an interface between the solution and a membrane is reduced so much that a negligible rate of cofactor loss through the membrane will result.

The present invention, then, is an improvement in the process of using an enzyme/cofactor complex to convert a substrate to a product, wherein a solution of said substrate is separated from a liquid dispersion of said complex by a membrane impermeable to said enzyme but permeable to said substrate, to said product and to said cofactor, the improvement comprising carrying out the conversion with an enzyme/cofactor dispersion in which the amount of enzyme is maintained in excess of that required to complex with all of the cofactor present therein.

DETAILED DESCRIPTION

As has been indicated above, the term "cofactor" is meant to include coenzymes to which a given membrane may be permeable. The process of the invention can be practiced with any enzyme/cofactor complex in which the enzyme exerts any substantial binding force on the cofactor and is too large to pass through the membrane to be used.

The term "dispersion" is meant to include true solutions as well as suspensions. The latter term includes not only colloidal suspensions but also suspensions of larger complex particles in which aggregation or settling is prevented by agitation, as by stirring for example.

In general, water will be the solvent of choice in the substrate-product solution and will be the dispersion medium of choice for the enzyme/cofactor complex. However, any otherwise suitable dispersion medium may be employed which is a solvent for the substrate and product and does not detrimentally effect the membrane or subsequent workup of the product solution.

An upper limit on the enzyme to cofactor ratio is imposed only by considerations of practicality and does not inhere in the nature of the process itself. A condition in which no cofactor loss whatever occurs is not necessary and generally cannot be attained (an equilibrium between free and complexed cofactor will always tend to be attained). However, the rate of loss can be reduced to any finite level considered acceptable by employing a sufficient excess of the enzyme. What is acceptable will of course depend on such considerations as process economics, product adulteration, etc., and will vary from one application to the next. Some reduction in cofactor loss results if any excess of the enzyme is employed. As a general rule, the rate of loss of cofactors is substantially reduced at an enzyme to cofactor equivalent ratio of about 1.1:1, even though the equilibrium concentration of free cofactor will be appreciable. At an equivalent ratio of 1.2 to 1, the equilibrium concentration of free cofactor is much lower and the loss rate is correspondingly diminished. Ratios above about 60 equivalents of enzyme per equivalent of cofactor generally are less desirable because lower conversion rates result as the concentration of cofactor in the dispersion is decreased. Ratios as high as 100:1 or more can of course be used but are of little further benefit. The range of about 1.2:1 to about 5:1 is considered as generally optimal.

As will be seen from Example 2 hereinafter, a dramatic reduction in cofactor loss can occur on going from an enzyme to cofactor equivalent ratio of 1:1 to a ratio of 1.2:1.

In many enzyme/cofactor systems, more than one cofactor is required and the complexing ratios for each cofactor may be different. For example, one molecule of Glucose Isomerase complexes with one cobalt ion and several magnesium ions. When such a system is employed in the practice of the present invention, the stoichiometric amount of enzyme required to bind all of the cofactor which is complexed in the lowest ratio to the enzyme will be the determining factor. The amount of enzyme present must exceed this requirement, even though only a slight excess for the cofactor which complexes in the lower ratio may be a quite large excess with regard to one or more other cofactors present.

Preferably, the enzyme to cofactor ratio desired is initially established simply by introducing the selected relative amounts of enzyme and cofactor to the reactor. A less desirable but operable method is to charge the reactor with an enzyme/cofactor mixture containing the requisite amount of enzyme and letting the loss of cofactor through the membrane proceed until an essentially self-limiting ratio results.

Ordinarily, the initial enzyme/cofactor ratio will be selected so that the rate of cofactor loss is quite low. Further, any decrease in the amount of cofactor present (as after a prolonged period of operation) will increase the enzyme to cofactor ratio and will therefore tend to be self-limiting. However, the relative amounts of enzyme and cofactor can be adjusted at any time without departing from the ambit of the present invention, provided that an excess over the stoichiometric amount of the enzyme is maintained.

The method of the instant invention has several significant advantages over other methods which have been employed or proposed to reduce cofactor losses — most notably, binding of the cofactor to soluble or insoluble polymers. The most apparent advantage is simplicity. No additional steps or different materials are required to set up the conversion system. Another and important advantage is that of mobility for the enzyme/cofactor complex. Free mobility of the complex permits attainment of the most favorable kinetics for the enzymatic conversion being carried out. A further advantage is that enzyme/cofactor complex or either component thereof can be added to the reactor and used therein under sterile conditions.

Techniques, apparatus, modes of operation, etc., for the process of the present invention are in accord with conventional practices with enzymatic reactors and will generally not be elaborated on herein. Considerable latitude in membrane properties is permissible. Outside of such requirements as that the membrane material shall not be soluble in or otherwise detrimentally affected by the liquid media employed, it is only necessary that the membrane be selectively permeable to the substrate and product but not to the enzyme. If the cofactor cannot pass through the membrane, there is no need for an excess of enzyme in the reactor. However, it is frequently the case that a membrane which is permeable to the substrate and product molecules will also be permeable to cofactors.

In a convenient configuration, the semi-permeable membrane takes the form of a generally parallel bundle of hairlike hollow fibers having open end portions passing through and potted in separate bodies of resin. These resin bodies ("tubesheets") are formed in sealing engagement with opposite ends of a piece of plastic or glass tubing adapted for lateral connection to fluid conduits for ingress and egress of the enzyme/cofactor dispersion. The fiber lengths which make up the bundle are immersed in the dispersion, which may be static or circulating. Units of this type, employing cellulose hollow fibers (about 200$\mu$ I.D.) having a permeate molecular weight cut-off of about 3,000–5,000, are commercially available from The Dow Chemical Company under the designation "DOWEX c/HFD-05" hollow fiber dialyzer.

Other types of hollow fiber permeability separatory devices are well known and it will be readily apparent which ones are suitable for a particular application. The process of the present invention can be practiced with any membrane configuration but hollow fibers are particularly preferred.

EXAMPLES

The reduction of pyruvate to L-lactate can be accomplished using L-selective enzyme lactate dehydrogenase and recycling the cofactor using alcohol dehydrogenase, driving the reaction with excess alcohol.

EXAMPLE 1

One milliliter of an aqueous solution containing 100 mg/ml. of lactate dehydrogenase enzyme (molecular wt. 145,000) was placed in contact with the outside surfaces of the hollow fibers within the jacket of a DOWEX c/HFD-05 permeator (5000 molecular weight cut off). Five ml. of 0.0008 molar aqueous pyruvate substrate solution was circulated through the fiber lumen at about 5 ml/minute. Five microliters of 0.01 molar NAD (Nicotinamide adenine dinucleotide) cofactor (molecular weight 700) was added to the 1.0 ml. of enzyme solution, thus providing an initial cofactor content of $5 \times 10^{-8}$ moles therein. The enzyme content was $7 \times 10^{-7}$ moles; a 14/1 mole ratio to the cofactor. Since each mole of enzyme can complex with 4 moles of cofactor, the enzyme content was 56 times the stoichiometric requirement. After 95 minutes, the NAD/NADH level in the 5 ml. substrate solution was 15 percent of the total in the system. This corresponds to a permeation coefficient of $3.8 \times 10^{-5}$ cm/min.

A parallel run was made with a zero content of enzyme and 0.01 molar in NAD (in 1.0 ml) and 10 ml of recirculating substrate solution. 48.3 percent of the total NAD was found in the substrate solution after 11 minutes. This corresponds to a permeation coefficient of $1.33 \times 10^{-3}$ cm/min. A 35 fold reduction in the permeation rate of the cofactor was thus accomplished using 55 equivalents in excess over the stoichiometric enzyme requirement; i.e., at an enzyme to cofactor equivalent ratio of 56 to 1.

EXAMPLE 2

One milliliter of an aqueous solution containing $8.33 \times 10^{-9}$ moles each of lactate dehydrogenase and alcohol dehydrogenase, 10% ethyl alcohol, and $6 \times 10^{-8}$ moles NADH was placed in the jacket of a DOWEX c/HFD-05 permeator so that it bathed the outside of the semipermeable hollow fibers contained therein. A 0.00072M pyruvate solution also with 10% ethyl alcohol was run continuously through the inside of the fibers at 0.229 cc/min rate. This system had two reactions occuring simultaneously:

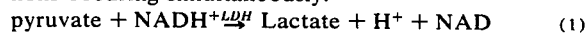

pyruvate + NADH+ ⇌ Lactate + H+ + NAD      (1)

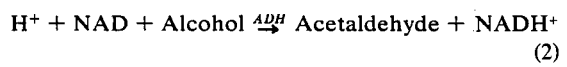

H+ + NAD + Alcohol ⇌ Acetaldehyde + NADH+      (2)

Thus the ADH regenerated the NAD to NADH+ so that pyruvate could continuously be converted by LDH to lactate. The lactate production rate decreased with time in relation to the loss of NAP/NADH through the membrane. After 42 minutes, the loss rate corresponded to a permeation coefficient for NAD of $3.3 \times 10^{-4}$ cm/min. The amount of enzyme present in this system was 1.2 times the stoichiometric requirement for the amount of cofactor initially present. That is, the enzyme to cofactor equivalent ratio was 1.2 to 1.

Under the same conditions, but in the absence of enzymes, the NADH had a permeation rate of $3.5 \times 10^{-3}$ cm/min. showing a 10.6 times lower rate of NAD cofactor loss with 1.2 equivalents of enzyme per equivalent of cofactor.

An additional experiment was run with the same enzyme, alcohol and cofactor concentrations, volumes, and flow but with 50μg or $6 \times 10^{-8}$ moles/ml of NAD placed in the pyruvate substrate so that the reactions would not be affected by NADH loss from the enzyme chamber. After 152 minutes, the rate of lactate production was unchanged from the rate at 20 minutes — indicating that cofactor loss was the sole reason for the loss in production rate in the absence of NAD in the substrate solution.

I claim:

1. In the process of using an enzyme/cofactor complex to convert a substrate to a product, wherein a solution of said substrate is separated from a liquid dispersion of said complex by a membrane impermeable to said enzyme but permeable to said substrate, to said product and to said cofactor, the improvement comprising carrying out the conversion with an enzyme/cofactor dispersion in which the amount of enzyme is maintained in excess of that required to complex with all of the cofactor present therein.

2. The process of claim 1 in which the equivalent ratio of enzyme to cofactor in said dispersion is from about 1.1:1 to about 100:1.

3. The process of claim 1 in which the equivalent ratio of enzyme to cofactor in said dispersion is from about 1.2 to about 60.

4. The process of claim 1 in which the membrane is in the form of hollow fibers.

5. The process of claim 1 in which the substrate is pyruvate, the product is L-lactate, the enzyme is L-lactate dehydrogenase, the cofactor is NAD and the equivalent ratio of enzyme to cofactor is at least 1.2 to 1.

6. The process of claim 1 in which the equivalent ratio of enzyme to cofactor in said dispersion is from about 1.2:1 to about 5.0:1.

* * * * *